US012067339B2

(12) United States Patent
Apte et al.

(10) Patent No.: US 12,067,339 B2
(45) Date of Patent: Aug. 20, 2024

(54) VOXEL-BASED ELECTROMAGNETIC-AWARE INTEGRATED CIRCUIT ROUTING

(71) Applicant: X Development LLC, Mountain View, CA (US)

(72) Inventors: Raj Apte, Palo Alto, CA (US); Zhigang Pan, Austin, TX (US); Dino Ruic, Santa Clara, CA (US); Cyrus Behroozi, Menlo Park, CA (US)

(73) Assignee: X Development LLC, Mountain View, CA (US)

( * ) Notice: Subject to any disclaimer, the term of this patent is extended or adjusted under 35 U.S.C. 154(b) by 283 days.

(21) Appl. No.: 17/570,019

(22) Filed: Jan. 6, 2022

(65) Prior Publication Data

US 2023/0214571 A1 Jul. 6, 2023

(51) Int. Cl.
*G06F 30/394* (2020.01)
*G06F 30/392* (2020.01)
*G06F 119/18* (2020.01)

(52) U.S. Cl.
CPC .......... *G06F 30/394* (2020.01); *G06F 30/392* (2020.01); *G06F 2119/18* (2020.01)

(58) Field of Classification Search
CPC .... G06F 30/394; G06F 30/392; G06F 30/398; G06F 2119/18
See application file for complete search history.

(56) References Cited

U.S. PATENT DOCUMENTS

| | | |
|---|---|---|
| 6,711,727 B1 | 3/2004 | Teig et al. |
| 6,957,411 B1 | 10/2005 | Teig et al. |
| 7,506,289 B1 | 3/2009 | Chapman |
| 7,506,295 B1 | 3/2009 | Teig |
| 7,823,113 B1 | 10/2010 | Waller et al. |
| 8,332,805 B1 | 12/2012 | Birch et al. |
| 8,949,760 B2 | 2/2015 | Birch et al. |
| 9,846,756 B2 | 12/2017 | Pan et al. |
| 10,706,200 B2 | 7/2020 | Sha et al. |
| 10,755,026 B1 | 8/2020 | Luo |

(Continued)

OTHER PUBLICATIONS

"A 3D Knowledge-Based Router for Wiring in Aerospace Vehicles", Christian Van der Velden, Cees Bil, Xinghuo Yu and Adrian Smith, ICAS 2006.*

(Continued)

*Primary Examiner* — Nha T Nguyen
(74) *Attorney, Agent, or Firm* — Botos Churchill IP Law

(57) ABSTRACT

A computer-implemented method for integrated circuit routing is described. The computer-implemented method comprising receiving a description of interconnected terminals of an integrated circuit with a wiring route electrically coupling the interconnected terminals and configuring a simulated environment defined via a plurality of voxels based on the description. The individual voxels included in the plurality of voxels each correspond to a spatial representation for a corresponding region of a layout associated with the integrated circuit. The computer-implemented method further includes determining local contributions of the individual voxels to a characteristic metric of the integrated circuit based on an electromagnetic simulation of the integrated circuit and revising the wiring route based on the local contributions of the individual voxels.

22 Claims, 6 Drawing Sheets

(56) References Cited

U.S. PATENT DOCUMENTS

| | | |
|---|---|---|
| 10,943,049 B2 | 3/2021 | Chuang et al. |
| 2023/0139623 A1* | 5/2023 | Roy ....................... G06N 3/044 |
| | | 716/104 |

OTHER PUBLICATIONS

Wang et al., Electronic Design Automation: Synthesis, Verification, and Test (The Morgan Kaufmann series in systems on silicon), Elsevier Science, 2009. pp. 687-749, ISBN 9780080922003.

Francisco et al., Design Rule Checking with a CNN Based Feature Extractor, eprint arXiv:2012.11510, Dec. 21, 2020.

Francisco et al., Machine Learning for Design Rule Checking, Multilayer CMP Hotspot Detection, and PPA Modeling with Transfer Learning and Synthetic Training, North Carolina State University, 2021.

Tabrizi et al., Eh Predictor: A Deep Learning Framework to Identify Detailed Routing Short Violations from a Placed Netlist, IEEE Transactions on Computer-Aided Design of Integrated Circuits and Systems, vol. 39, No. 6, 2020.

McMurchie et al., PathFinder: A Negotiation-Based Performance-Driven Router for FPGAs, Third International ACM Symposium on Field-Programmable Gate Arrays, pp. 111-117, 1995.

Shi et al., A Fast Hierarchical Algorithm for Three-Dimensional Capacitance Extraction, IEEE Transactions on Computer-Aided Design of Integrated Circuits and Systems, vol. 21, No. 3, Mar. 2002.

\* cited by examiner

200

205 — RECEIVE DESCRIPTION OF INTEGRATED CIRCUIT PROVIDING INTERCONNECTIONS BETWEEN INDIVIDUAL TERMINALS INCLUDED IN A PLURALITY OF TERMINALS

210 — SEPARATE THE PLURALITY OF TERMINALS INTO DIFFERENT NETS BASED ON THE INTERCONNECTIONS

215 — FOR EACH NET INCLUDED IN THE DIFFERENT NETS

220 — CONFIGURE INSTANCE OF SIMULATED ENVIRONMENT TO BE REPRESENTATIVE OF THE NET VIA A PLURALITY OF VOXELS

225 — DETERMINE LOCAL CONTRIBUTIONS OF INDIVIDUAL VOXELS INCLUDED IN THE PLURALITY OF VOXELS TO A CHAR. METRIC VIA AN ELECTROMAGNETIC SIMULATION

230 — GENERATE WIRING ROUTE FOR THE NET BASED ON THE LOCAL CONTRIBUTIONS OF THE INDIVIDUAL VOXELS IN THE INSTANCE OF THE SIMULATED ENVIRONMENT

235 — NEXT NET

240 — DETERMINE CONVERGENCE METRIC INDICATIVE OF A PRESENCE OF ROUTING CONFLICTS BETWEEN THE DIFFERENT NETS BASED ON WIRING ROUTES

245 — CONVERGENCE METRIC ≤ THRESHOLD — YES / NO

250 — DETERMINE PENALTY TO APPLY TO THE INDIVIDUAL VOXELS TO ADJUST THE CHAR. METRIC BY AFFECTING THE LOCAL CONTRIBUTIONS OF THE INDIVIDUAL VOXELS

255 — CONVERGE THE WIRING ROUTES INTO A FINALIZED LAYOUT OF THE INTEGRATED CIRCUIT

FIG. 2

VOXEL-BASED ELECTROMAGNETIC-AWARE INTEGRATED CIRCUIT ROUTING

TECHNICAL FIELD

This disclosure relates generally to integrated circuits, and in particular but not exclusively, relates to first principles electronic design automation for integrated circuit routing and layout generation.

BACKGROUND INFORMATION

Routing is a fundamental problem in electronic design and automation, which generates wiring to interconnect pins of a common signal while obeying manufacturing design rules. For very large-scale integrated circuit designs, in which there may be billions of transistors in a single chip, routing optimization is particularly challenging due to the complexity of the integrated circuit. Typically, routing is separated into at least a global routing stage and a detailed routing stage, in which global routing plans general routing paths without considering the manufacturing design rules of a given vendor process node and detailed routing determines the exact route.

Conventional routing algorithms may be generated using a multi-dimensional grid-based graph-search technique (e.g., two-dimensional grids with a third dimension corresponding to routing layers), where routing resources are modeled as a graph in which the graph topology can represent the integrated circuit structure. Global routing can then partition the graph into tiles and find tile-to-tile paths to guide the detailed router. The detailed router then superimposes a grid, in which each unit of the grid is larger than or equal to the sum of the minimum width and spacing of wires for the given vendor process node, on the graph to find the exact wiring route. Typical routers generate detailed routes sequentially and have preferred routing directions (i.e., metal wires arranged in horizontal or vertical directions for different metallization layers of the integrated circuit) and thus may be limited in both efficiency and geometry (e.g., limited to Manhattan geometry of vertical and horizontal straight lines).

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

FIG. 2 shows an example method for generating a layout of an integrated circuit via voxel-based electromagnetic-aware routing, in accordance with an embodiment of the present disclosure.

DETAILED DESCRIPTION

Figure 1:
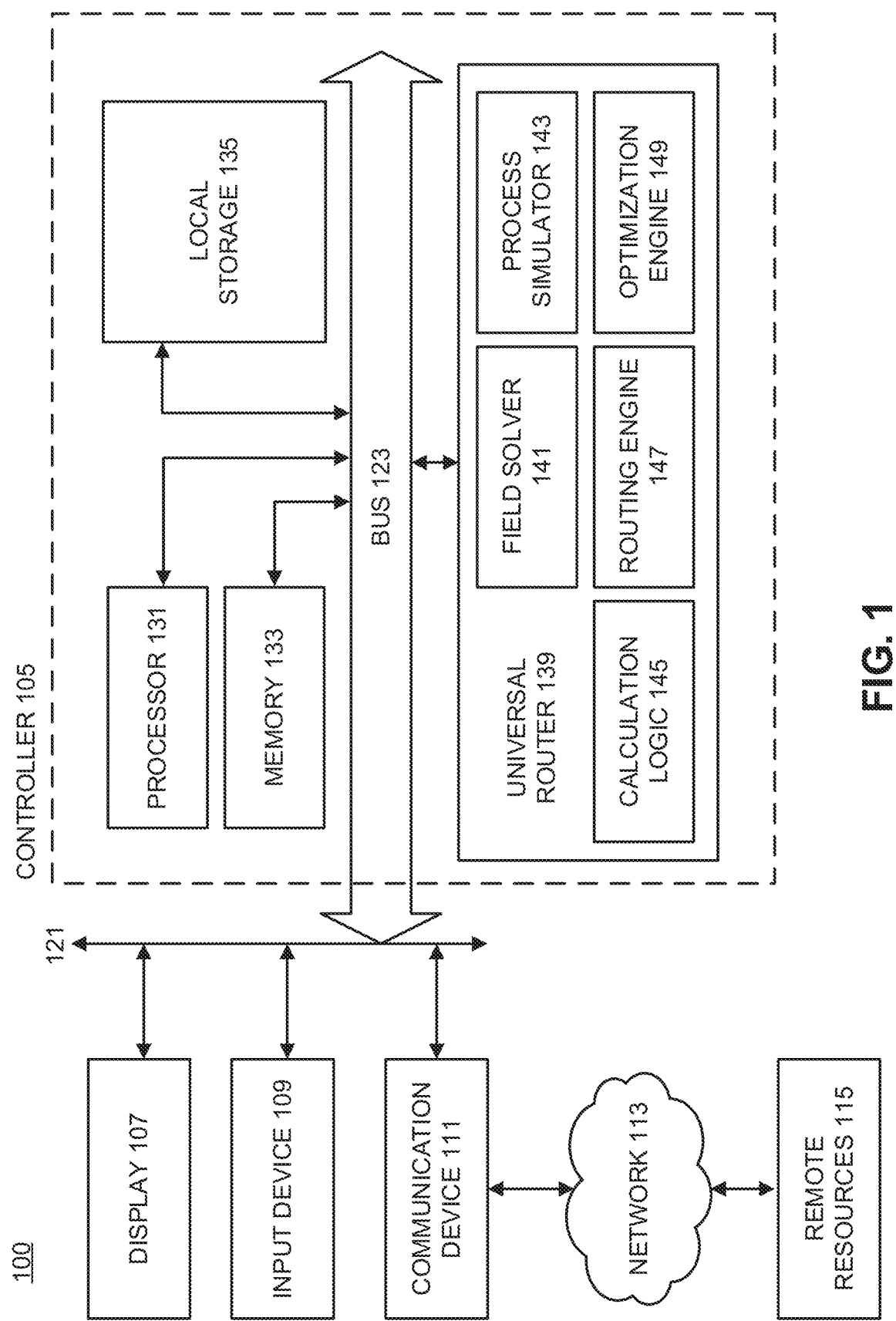
FIG. 1 is a functional block diagram illustrating a system for generating a layout of an integrated circuit via voxel-based electromagnetic-aware routing, in accordance with an embodiment of the present disclosure.

Embodiments of a system and method for voxel-based electromagnetic-aware integrated circuit routing are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Most fundamental properties of an integrated circuit are related to resistances and capacitances. The delay in charge and decharging the integrated circuit every clock-cycle is directly given by the RC time constant. The capacitance is related to the amount of charge flowing in and out of the circuit and so the current can be derived and then the power necessary to drive the integrated circuit follows. Moreover, the Joule heat a circuit generates during operation follows immediately from the resistance and current as well. More recently, phenomena like electromigration and dielectric breakdown have impacted the reliability of integrated circuits, which are also related to the field strengths in the conductor (e.g., metals such as Au, Ag, Al, Cu, Ti, a combination thereof to form a metal alloy, or any other suitable material that has a conductivity greater than a target conductivity) and in between conductors (e.g., oxides such as $SiO_2$, $SiO_x$, or any other insulator that has a relative permittivity greater than a target permittivity).

Described herein are embodiments of an iterative voxel-based electromagnetic-aware router capable of using first principles to generate wiring routes for integrated circuits. Specifically, a plurality of voxels may be utilized to describe an integrated circuit in which RC-parameters of arbitrarily shaped three-dimensional (3D) interconnect structures can be obtained to correlate macroscopic features of the integrated circuit (e.g., resistance, capacitance, admittance, impedance, RC time constant, or other characteristic parameters) with local properties of individual voxels included in the plurality of voxels such as conductivity and permittivity. More succinctly, electromagnetic simulations of an integrated circuit are utilized to determine local contributions of the individual voxels to a characteristic metric derivable from the electromagnetic simulation (e.g., one or more of the macroscopic features of the integrated circuit to be reduced, minimized, increased, adjusted, or otherwise optimized), which in turn are utilized to guide an iterative router in generating wiring routes.

In some embodiments, a penalty is applied to the individual voxels in accordance with their respective local contributions to adjust (e.g., reduce, increase, or otherwise optimize) the characteristic metric. In one embodiment, the penalty may be designed to influence the material parameter (e.g., conductivity and/or permittivity) of the individual voxels when performing the electromagnetic simulations such that the local contributions are affected. For example, a material parameter of a given voxel may be adjusted (e.g., from being a conductor to an insulator or vice versa) based on relative contributions to the characteristic metric. Thus, each routing iteration may include the router generating wiring routes based on the local contributions to the characteristic metric followed by updating the penalty if one or more threshold conditions to finalize routing are not met.

Additionally, it is appreciated that routing is a multifaceted problem not limited to performance characteristics of the integrated circuit. Indeed, fabricability of the integrated circuit layout (i.e., the wiring routes collectively necessary to electrically coupled interconnected pins or terminals of constituent components of the integrated circuit) in accordance with the design rules of a given vendor process node is also important. Accordingly, in some embodiments, the penalty may additionally or alternatively be associated with manufacturing constraints associated with design rules of the given vendor process node such that iterative updates to the penalty enforces fabricability of the wiring routes generated by the router. In doing so, fabricability of the layout generated from the wiring routes can be ensured.

It is appreciated that embodiments associated with a voxel-based and electromagnetic-aware router described herein are capable of simultaneously routing all nets of an integrated circuit. Additionally, the router is capable of flat detailed routing without the need of global routing and direct handling of layer assignment by choosing the least resistive path when possible. Moreover, the wiring routes are not necessarily limited to Manhattan geometry and may correspond to free-form non-Manhattan routing geometry with variable widths and shapes, including convex and concave curved features, subject to manufacturability. Additionally, by setting proper parameters, the router can be tuned to deal with various design objectives associated with a characteristic metric (e.g., resistance, capacitance, RC time constant, impedance, admittance, admittance density, timing, power, electromigration, fabricability, wire length, number of vias, any other metric by which the design of the layout for the integrated circuit can be optimized, or combinations thereof).

FIG. 1 is a functional block diagram illustrating a system 100 for generating a layout of an integrated circuit via voxel-based electromagnetic-aware routing, in accordance with an embodiment of the present disclosure. The system 100 is a design tool (e.g., for electronic design automation) for designing electronic systems such as integrated circuits, printed circuit boards, and the like. More specifically, the system 100 may, in response to receiving an input (e.g., a description of an integrated circuit), generate an integrated circuit layout (e.g., in the form of a layout database file such as GDSII or OASIS, a maskset, or other representation) optimized for fabricability and performance. (i.e., reduced, increased, or otherwise optimized characteristic metric).

As illustrated, the system 100 includes controller 105 coupled to display 107, input device(s) 109, communication device(s) 111, network 113, and remote resources 115 via bus 121 and bus 123. The controller 105 includes processor 131, memory 133, local storage 135, and universal router 139. The universal router 139 includes field solver 141, process simulator 143, calculation logic 145, routing engine 147, and optimization 149. It is appreciated that in some embodiments, controller 105 may be a distributed system.

The controller 105 is coupled to the display 107 (e.g., a light emitting diode display, a liquid crystal display, and the like) for displaying information to a user utilizing the system 100 to generate one or more integrated circuit layouts. Input device 109 is coupled to the controller 105 for communicating information and command selections to the processor 131 (e.g., for a user to provide the description of an integrated circuit). Input device 109 may include a mouse, trackball, keyboard, stylus, or other computer peripheral, to facilitate an interaction between the user and the controller 105. In response, the controller 105 may provide verification of the interaction through the display 107.

Another device, which may optionally be coupled to the controller 105, is the communication device 111 for accessing the remote resources 115 of a distributed system via the network 113. Communication device 511 may include any of a number of networking peripheral devices to facilitate access to the remote resources 115 via a local network, a wide area network, the internet, or other telecommunication network. Note that any or all of the components of system 100 illustrated in FIG. 1 and associated hardware may be used in various embodiments of the present disclosure. The remote resources 115 may be part of a distributed system and include any number of processors, memory, and other resources for facilitating the generation of integrated circuit layouts.

Controller 105 orchestrates operation of system 100 (e.g., in response to executing instructions stored in memory 133, user commands received via the input device 109, or otherwise) to generate one or more integrated circuit layouts using the universal router 139. Processor 131 (e.g., one or more central processing units, graphics processing units, and/or tensor processing units, etc.), memory 133 (e.g., volatile memory such as DRAM and SRAM, non-volatile memory such as ROM, flash memory, and the like), local storage 535 (e.g., magnetic memory such as computer disk drives), and the universal router 139 are coupled to each other through bus 523. Controller 105 includes software (e.g., instructions included in memory 133 coupled to processor 531) and/or hardware logic (e.g., application specific integrated circuits, field-programmable gate arrays, and the like) that when executed by controller 105 causes controller 105 or system 100 to perform operations. The operations may be based on instructions stored within any one of, or a combination of, memory 133, local storage 135, universal router 139, and remote resources 115 accessed through network 113.

In the illustrated embodiment, modules 141-149 of the universal router 139 are utilized to generate fabricable integrated circuit layouts in which the layout of the integrated circuit is described by a plurality of voxels in accordance with embodiments discussed herein. In some embodiments, the system 100 may utilize the fielder solver 141 to directly solve Maxwell's equations to perform an electromagnetic simulation of the integrated circuit represented by the plurality of voxels to determine local contributions of the individual voxels to the characteristic metric. The process simulator 143 provides instructions for performing a process simulation of the layout associated with wiring routes generated by the routing engine 147. In some embodiments, the process simulator 143 may be utilized to check for compliance with design rules of a vendor process node, conductivity collections between the wiring routes of different nets, or the like. The calculation logic 145 provides instructions for determining the characteristic metric of the integrated circuit, the local contributions to the characteristic metric of individual voxels, a penalty to be applied to the individual voxels based on the local contributions, and the like. The routing engine 147 provides instructions for generating the wiring routes based on the local contributions (which may be affected by the penalty determined by the calculation logic 145) of the individual voxels (e.g., to find a path of least resistance between individual voxels representative of terminals that should be electrically coupled). In other words, the routing engine 147 establishes how to form connections between terminals that should be electrically coupled. The optimization engine 149 provides instructions for further optimization of the wiring routes. Specifically, the optimization engine 149 may provide instructions for determining local update rules based on the fields associated with the individual voxels to lead towards RC-optimality once the layout has been fully routed.

FIG. 2 shows an example method 200 for generating a layout of an integrated circuit via voxel-based electromagnetic-aware routing, in accordance with an embodiment of the present disclosure. It is appreciated that the method 200 may be implemented by a system performing operations (e.g., system 100 of FIG. 1) to perform iterative optimization of a characteristic metric to generate a fabricable integrated circuit layout. In the same or other embodiments, the method 200 may be a computer-implemented method including instructions provided by at least one machine-accessible storage medium (e.g., non-transitory memory) that, when executed by a machine (e.g., a computer), will cause the machine to perform operations for generating the integrated circuit layout via voxel-based electromagnetic-aware routing. It is further appreciated that the order in which some or all of the process blocks appear in the method 200 should not be deemed limiting. Rather, one of ordinary skill in the art having the benefit of the present disclosure will understand that some of the process blocks may be executed in a variety of orders not illustrated, or even in parallel.

Block 205 shows receiving of an integrated circuit. The description provides information regarding interconnections between individual terminals included in a plurality of terminals associated with the integrated circuit. The description may correspond to a netlist, a layout, a schematic, a diagram, or any other representation of an integrated circuit for which terminal location, quantity, and connectivity may be obtained. In some embodiments the description may further include wiring route information (e.g., unoptimized or unfabricable wiring routes), information regarding number of metallization layers, physical dimensions of the integrated circuit, wiring routes, or the like. However, in other embodiments the description may provide no specific wiring routes for the interconnections or metallization layer information. It is appreciated that an integrated circuit may contain many components (e.g., resistors, transistors, capacitors, diodes, transistors, or other electronic subcomponents) with a specific or relative arrangement of the components provided by the description. Each of the components may include one or more terminals or pins, which are expected to be interconnected in a specific manner to ensure functionality of the integrated circuit. Accordingly, the interconnections provided by the description indicates how individual terminals in the plurality of terminals are interconnected. In some embodiments, the description may further provide information related to terminals not directly located on the integrated circuit (e.g., a ground connection). In the same or other embodiments, the description may additionally provide information related to directionality of current flow between interconnected terminals.

Figure 3A:
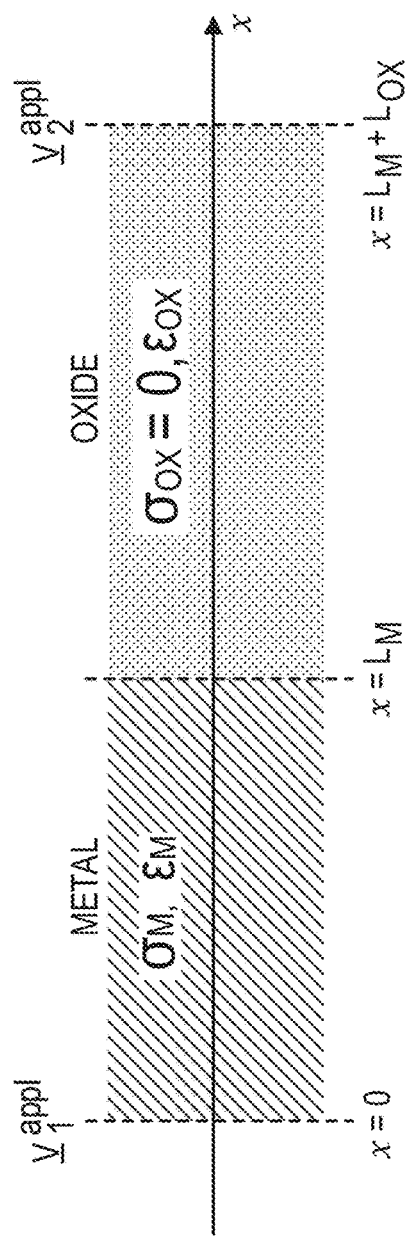
FIG. 3A illustrates a physical structure of a one-dimensional RC component with terminals on each side, in accordance with an embodiment of the disclosure.

Block 210 illustrates separating the plurality of terminals into different nets based on the interconnections described in the description (see, e.g., FIG. 3A for an illustrative example). In some embodiments, each net included in the different nets is representative of interconnected terminals included in the plurality of terminals. The interconnected terminals to be electrically coupled via a corresponding wiring route. It is appreciated that each net included in the different nets includes at least two interconnected terminals. In some embodiments, when a given interconnection includes more than two terminals, the given interconnection may be separated into multiple nets to limit the number of terminals per net to two, which may make certain calculations computationally easier. However, in most embodiments, the number of terminals per net is not limited to two. In the same or other embodiments, each net is intended to be electrically isolated from each other net to the extent that wiring routes of the different nets are not in direct electrical contact (e.g., to prevent or mitigate shorting between nets).

Block 215 shows a loop including blocks 220, 225, and 230 that may be applied to each net included in the different nets to generate, revise, or otherwise optimize wiring routes for the different nets via voxel-based electromagnetic-aware routing.

Block 220 illustrates configuring an instance of a simulated environment to be representative of a given net included in the different nets. The simulated environment is based on the description received in block 205 and representative of a layout associated with the integrated circuit. More specifically, the simulated environment is defined by a plurality of voxels, in which each voxel corresponds to a spatial discretization or representation of a corresponding region of the layout. In other words, the layout for the integrated circuit is segmented by the plurality of voxels. Each of the individual voxels is a three-dimensional discretization with a specific size, shape, and volume. In some embodiments, each of the individual voxels have a common size, a common shape, and/or a common volume. In other embodiments, the individual voxels may have different sizes, different shapes, and/or different volumes such that the simulated environment may be discretized into a more general set of cells of varying sizes and shapes. Accordingly, in some embodiments, individual voxels included in the plurality of voxels may be referred to more generally as discretization cells or cells. For example, in one embodiment, the plurality of voxels may include a first voxel having a first volume and a second voxel having a second volume different than the first volume. There may be certain computational advantages for having different sized voxels. For example, regions of the simulated environment unlikely to be utilized for a wiring route of a given net may have a larger size relative to other voxels such that computational burden of an electromagnetic simulation is reduced. It is appreciated that the individual voxels are not necessarily limited to a specific shape, which may include any one of or a combination of cubes, cuboids, triangular prisms, spheres, cylinders, tetrahedrons, hexagonal prisms, pyramids, or other shapes not explicitly listed. Rather, it is appreciated that the plurality of voxels provides an arbitrary resolution for the simulated environment that may be configured to be representative of the layout of the integrated circuit. In some embodiments, each of the individual voxels are sufficiently small such that a given terminal included in the plurality of terminals of the integrated circuit is represented by more than one voxel included in the plurality of voxels.

In some embodiments, the individual voxels each include a material parameter indicative of a material property of the corresponding region of the layout. In other words, the individual voxels may describe a material component of the layout (i.e., which regions are conducting and insulating). In one embodiment, the material parameter is associated with at least one of conductivity or relative permittivity. It is appreciated that the material parameter of the individual voxels may be directly or indirectly utilized to conduct an electromagnetic simulation of the integrated circuit based on the configuration of the simulated environment.

In one or more embodiments, configuring the simulated environment to be representative of the integrated circuit based on the description may include setting a coordinate system (e.g., cartesian, cylindrical, spherical, curvilinear, or the like), a size, a shape, and/or a quantity of the individual voxels included in the plurality of voxels. Configuration may further include assigning the material parameter of the individual voxels to be consistent or otherwise representative of the description of the integrated circuit (e.g., based on the arrangement and position of the plurality of terminals associated with the integrated circuit). For example, voxels representative of terminals of a given net may be assigned a material parameter corresponding to a conductor (e.g., a metal such as Au, Ag, Al, Cu, Ti, a combination thereof to form a metal alloy, or any other suitable material that has a conductivity greater than a target conductivity). Conversely, voxels representative of regions known or otherwise selected to not be used for a wiring route of a given net may have their material parameter configured to be an insulator (e.g., oxides such as $SiO_2$, $SiO_x$, or any other insulator that has a relative permittivity less than a target permittivity). In some embodiments, the instance of the simulated environment associated with the given net is representative of the given net without other nets included in the different nets. In other words, the plurality of voxels may be configured for each instance of the simulated environment such that the different nets do not interact with one another.

Block 225 shows determining local contributions of the individual voxels to a characteristic metric of the integrated circuit based on an electromagnetic simulation of the integrated circuit. The characteristic metric may be based on an objective function defining one or more parameters of a given net of the integrated circuit corresponding to the instance of the simulated environment (i.e., objectives may be net-based) and/or based on a collective property of the integrated circuit (i.e., objectives may be based on the integrated circuit as a whole). The characteristic metric may include any electric characteristic or parameter that can be derived or otherwise inferred from first principles simulations of the given net and/or the integrated circuit based on the simulated environment such as, but not limited to, resistance, capacitance, admittance, admittance density, impedance, or RC time constant. In some embodiments, the characteristic metric may also include manufacturing constraints associated with design rules of a given vendor process node expected to be utilized when fabricating the integrated circuit. In other words, the characteristic metric may be further representative of a manufacturing constraint associated with a fabricability of the wiring routes of the integrated circuit (e.g., determined in previous iterations of the method 200).

In one or more embodiments, the electromagnetic simulation corresponds to a simulation of the given net (i.e., the instance of the simulated environment associated with the given net and iteration of the loop) or the integrated circuit as a whole (e.g., based on the layout or the wiring route of previous iterations of the method 200). The electromagnetic simulation may generate either (or both) electrostatic or electromagnetic field values for each of the individual voxels in response to a bias signal and based on the material parameter of the individual voxels. In one embodiment, the electromagnetic simulation corresponds to generating electrostatic fields for each of the individual voxels in the instance of the simulated environment in response to a bias signal applied to voxels associated with one of the terminals of the given net. In some embodiments, the field values (e.g., electrostatic and/or electromagnetic) may be determined by a field solver configured to operate in the voxel domain (i.e., three-dimensional space). In some embodiments, the local contributions may directly correspond to the field values determined from the electromagnetic simulation.

In the same or other embodiments, the local contributions to the characteristic metric may be computed based on the field values obtained via the electromagnetic simulation. For example, the current density, admittance density, or more generally flux of a parameter related to resistance or capacitance of the given net or the integrated circuit may be calculated for the individual voxels. In other words, how the field values of the individual voxels change over time during the electromagnetic simulation may be utilized to determine how current is flowing through the simulated environment in response to the bias signal, which in turn may be utilized to calculate the local contribution of the individual voxels to the characteristic metric. It is further appreciated that since the field values from the electromagnetic simulation are based on the material parameter of the individual voxels, then the local contributions are calculated, at least in part, based on the material parameter of the individual voxels. In some embodiments, admittance density for each of the individual voxels may be calculated based on the field values to determine how the individual voxels influence the admittance matrix of the net. In some embodiments, admittance density corresponds to a scalar field of the simulated environment, which describes the local contribution to the admittance of a given net and/or integrated circuit being simulated by the simulated environment. In other words, the admittance density describes how much each coordinate (e.g., voxel or cell) contributes to the overall conductance and capacitance of the integrated circuit. It is appreciated that the admittance density may be derived, in part, from the field values of an electromagnetic simulation of the simulated environment (see, e.g., equation (18) as discussed hereinafter).

Block 230 illustrates generating wiring routes for the different nets based on the local contributions of the individual voxels (e.g., a wiring route for a given net associated with a corresponding instance of the simulated environment may be determined once the local contributions of the individual voxels are determined). In some embodiments, the wiring route may correspond to the path of least resistance between interconnected terminals, which may be determined based on the local contributions and/or the electromagnetic simulation. In the same or other embodiments, the wiring route may correspond to the shortest path between interconnect terminals that results in an adjusted (e.g., reduced) characteristic metric value based on the local contributions. In another embodiment, fluxes (e.g., admittance density) between the interconnected terminals may be calculated or otherwise correspond to the local contributions, which in turn show the preferred paths between the interconnected terminals (e.g., the electromagnetic simulation and/or local contributions show directly or indirectly how current prefers to flow between the interconnect terminals, which can be utilized to determine the wiring route). In other words, the wiring route generated for a given net may correspond to a preferred path based on the electromagnetic simulation when considering the local contributions.

Block 235 shows performing additional iterations of the loop associated with blocks 220, 225, and 230 until there are enough instances of the simulated environment to be collectively representative of the layout associated with the integrated circuit. As discussed above, during each iteration of the loop an instance of the simulated environment defined by a plurality of voxels is configured to be representative of a given net included in different nets, an electromagnetic simulation is performed to determine local electric fields (e.g., in response to a bias signal) to determine local contributions of the individual voxels to a characteristic metric, and a wiring route for the given net is determined based on the local contributions (e.g., selecting path of least resistance based on the individual voxel contributions to the characteristic metric or otherwise determined from the field quantities calculated from the electromagnetic simulation). Since, each instance included in the instances of the simulated environment is representative of a corresponding one of the different nets, then the instances of the simulated environment, including the wiring routes determined in block 230, are representative of the layout of the integrated circuit with the individual voxels included in the plurality of voxels corresponding to respective regions of the layout. Advantageously, determining the wiring route for each net in a corresponding instance of the simulated environment allows for simultaneous generation of the wiring routes for all nets included in the different nets. Once all wiring routes have been generated, block 235 proceeds to block 240 or other subsequent blocks for determining whether the wiring routes conflict with one another, whether the wiring routes are manufacturable, and whether the layout of the integrated circuit is manufacturable, in accordance with embodiments of the disclosure.

Block 240 illustrates determining a convergence metric indicative of a presence of routing conflicts between the different nets based on the wiring routes. As discussed above, each instance of the instances of the simulated environment may have a different configuration of the plurality of voxels based on the corresponding net being described by the instance of the simulated environment. Thus, during iterations of the method 200, there may be overlap between the wiring routes, which indicates where the wiring routes intersect (i.e., one or more occurrences of shorts between wiring routes of different nets), which may negatively impact performance and/or functionality of the integrated circuit. In other words, block 240 checks identifies incompatible regions of the layout corresponding to where conductivity collisions across different instances included in the instances of the simulated environment occur between spatially overlapping voxels included in the plurality of voxels. The term "conductivity collision" indicates where voxels associated with conductive regions of the wiring routes overlap between instances of the simulated environment. In some embodiments, this may be determined from the local contributions of the individual voxels (e.g., when the local contribution is associated with or otherwise corresponds to a flux or admittance density). In the same or other embodiments, the convergence metric corresponds to the sum of a geometric mean of the local contributions for each of the individual voxels across all instances of the simulated environment. In some embodiments, the convergence metric corresponds to the number of times where the same regions (i.e., voxels associated with a common spatial location across different instances of the simulation environment) have non-zero local contributions to the characteristic metric.

Block 245 shows determining whether the convergence metric determined from block 240 is less than or equal to a threshold value or range (e.g., a convergence threshold). In one embodiment no conductivity collisions may be allowed to occur and thus the threshold value may be zero. In other embodiments, the threshold may be near zero. When the convergence metric is less than or equal to the threshold then block 245 proceeds to block 255. However, when the convergence metric is greater than the threshold then block 245 proceeds towards block 250. In another embodiment the threshold may be related to a rate of change of the convergence metric during iterations of the method 200. For example, the convergence metric may start to converge towards an unknown minimum value. As this convergence occurs, the rate of change of the convergence metric may decrease as the convergence metric approaches the unknown minimum value. Once the rate of change of the convergence metric is below the threshold, then convergence of the wiring routes may be considered to have occurred.

Block 250 illustrates determining a penalty to apply to the individual voxels to adjust the characteristic metric by affecting the local contributions of the individual voxels. In other words, the penalty is expressed in a manner that influences the local contributions determined from the electromagnetic simulation. By tailoring the penalty to the factors influencing the local contributions, optimization for both performance of the integrated circuit (i.e., adjustment of the characteristic metric) and manufacturability of the layout may be accomplished simultaneously. That is to say, contrasting features (e.g., the wiring route that results in the best performance or lowest characteristic metric may not necessarily be manufacturable) may be optimized to obtain a layout or design for the integrated circuit that is both routed and manufacturable, which is able to be achieved without necessarily relying on a complicated set of design rules (e.g., from manufacturing design rules of a given vendor process node that are often expressed in terms of geometric relations between rectangles that are difficult to directly optimize).

As discussed above in the context of block 225, the local contributions correspond to or are otherwise calculated from the field values of the individual values determined from the electromagnetic simulation of the different nets and/or integrated circuit. The field values from the electromagnetic simulation are based, at least in part, on the material parameter of the individual voxels, which may correspond to conductivity and/or permittivity. Thus, in some embodiments, the penalty may replace or otherwise influence the material parameters of the individual voxels. Accordingly, as iterations of the method 200 occurs the material parameter of the individual voxels for each of the instances of the simulated environment may converge to indicate whether the individual voxels should be a conductor or an insulator.

In some embodiments, the penalty is applied to reduce, increase, or otherwise adjust the characteristic metric during subsequent iterations of the method 200 (i.e., individual voxels are penalized according to their relative contributions to the characteristic metric, which causes subsequent iterations of the method 200 to be less likely to use the penalized voxel for the wiring routes). Furthermore, the penalty may be cumulative, such that as the iterations of the method 200 occur, the penalty applied to the individual voxels will gradually increase with each subsequent iteration of the method 200 if the individual voxel affected by the penalty continue to contribute to the characteristic metric, unfabricability of the wiring route, and/or integrated circuit layout.

In one or more embodiments, determining the penalty to apply to the individual voxels includes determining for which voxels the penalty should be applied and/or updated. In one embodiment, the individual voxels associated with the conductivity collisions (e.g., individual voxels identified during block 240 as corresponding to where conductivity collisions across different instances included in the instances of the simulated environment occur between spatially overlapping voxels included in the plurality of voxels) may be penalized to reduce the likelihood of conductivity collisions in future iterations of the method 200. In the same or other embodiments, the penalty may alternatively or further include manufacturing constraints such that individual voxels that contribute to unfabricability of the wiring routes and/or layout of the integrated circuit are penalized.

In some embodiments, block 250 may include determining whether the wiring routes are fabricable. In the same embodiment, the characteristic metric may also be representative of a manufacturing constraint associated with a fabricability of the wiring routes such that fabricability of the wiring routes is also optimized. In such an embodiment, this may include identifying one or more unfabricable voxels associated with the wiring routes and revising (e.g., increasing, decreasing, or otherwise adjusting) the penalty applied to the unfabricable voxels to encourage fabricability of the wiring routes. In the same or other embodiments, determining whether the wiring routes are fabricable includes performing a process simulation to generate a fabrication maskset representative of the wiring routes. The fabrication maskset may be subsequently analyzed to determine whether there are unfabricable regions associated with the individual voxels to be penalized to increase the likelihood of fabricability of the maskset (and thus the wiring routes and/or layout from which the maskset is derived).

Once the individual voxels that are associated with the conductivity collisions and/or unfabricability of the wiring routes and/or layout of the integrated circuit are determined, the penalty may be applied or otherwise updated to affect the local contributions calculated in subsequent iterations of the method 200. More succinctly, the penalty is applied to the individual voxels to adjust (e.g., reduce, increase, or otherwise optimize) the characteristic metric and increase fabricability. Block 250 then proceeds back to block 215, where one or more iterations of the loop associated with blocks 220-230 may occur. Consequently, during subsequent iterations of the method 200, recalculated local contributions of the individual voxels to the characteristic metric with the material parameter of the individual voxels affected by the penalty may be determined and the wiring routes may be revised based on the recalculated local contributions.

Block 255 shows converging the wiring routes into a finalized layout of the integrated circuit when the convergence metric is below the threshold (i.e., the convergence threshold) of block 245. The finalized layout may be represented as a layout database file such as GDSII or OASIS, a maskset, or any other representation from which the finalized layout may be derived.

In some embodiments, a three-dimensional cell domain D (e.g., a simulated environment) includes a set of N nets embedded in an oxide (e.g., based on a description of an integrated circuit). In such an embodiment, the domain of nets or metal interconnects (e.g., wiring routes) may be denoted as M and the oxide domain as O such that $D=M \cup O$ and $M \cap O = \emptyset$.

In most embodiments, each net needs at least one terminal that supplies its voltage. So if the metal domain is written as a union of its nets $M=\cup_{k=1}^{N} M_k$, where the $M_k$ are pair-wise disjoint, a subset of the boundary of each of the metal interconnects can be associated as terminals represented as $T_k^j \subset \partial M_k$ with $j \in \{1, 2, \ldots\}$. It is appreciated that an interconnect should have at least one terminal, but beyond that there may be arbitrarily many. In some embodiments, it will be assumed that CMOS technologies will be utilized for the integrated circuit, in which an assumption that there is no DC current is valid and thus the stationary voltages of all terminals of a metal interconnect coincide. In the following embodiment there will be an assumption of just one terminal domain per metal interconnection in order to simplify the notation to show that current can be derived through Maxwell's equations. However, it is appreciated that the term $T_k$ might be disjoint. It is also appreciated that nets may be connected to external pins, so in some embodiments the terminal sets may map to the external pin location. In the same or other embodiments, the terminals may also represent pins of standard cells described in a process design kit associated with a fabrication process of the integrated circuit. In some embodiments, one or more nets are internal and obtain their bias from source or drain contacts of switching transistors, for example, in which sets of terminals may be respectively mapped to the source or drain trenches.

For the terminal $T_k$ on the metal interconnect $M_k$ the terminal current can be defined in its most general form as $$I_k(t) = \int_{T_k} dA \cdot \left[ J(r, t) + \frac{\partial D}{\partial t}(r, t) \right], \quad (1)$$

where J is the charge current density and D is the displacement field. It is noted that by convention the area element dA points to the inside of the device. In some embodiments, small sinusoidal perturbations of the bias at the terminal $T_l$ is introduced to extract the RC-components of the metal interconnects, for example, as $$V_\ell^{appl}(t) = V_{\ell,\partial}^{appl} + \text{Re}\{\underline{V}_\ell^{appl} e^{i\omega t}\}.$$

These small sinusoidal perturbations cause small sinusoidal perturbations of all other quantities, for example $$J(r,t) = J_0(r) + \text{Re}\{\underline{J}(r) e^{i\omega t}\},$$

$$D(r,t) = D_0(r) + \text{Re}\{\underline{D}(r) e^{i\omega t}\}.$$

It is noted how the time-dependency is completely described by the exponential in the described embodiment. In particular, the terminal current at terminal k reads $$I_k = \sum_\ell Y_{k\ell} V_\ell^{appl}. \qquad (2)$$

The parameter $Y_{kl}$ corresponds to the admittance and may be expressed using its real and imaginary parts as $$Y_{kl} = G_{kl} + i\omega C_{kl},$$

with the conductance $G_{kl}$ and the capacitance $C_{kl}$ matrices. It is appreciated that the extraction of the RC time constants is equivalent to finding the admittance parameters $Y_{kl}$, which in some embodiments corresponds to the local contribution of the individual voxels to the characteristic metric. In some embodiments additional dependencies may also be considered (e.g., in the presence of non-linear circuit elements such as transistors), which may or may not be simplified into effective linear circuit elements such as effective gate capacitances in large-signal operation. In particular, an expression will be derived for the admittance using Equation (1) for arbitrarily shaped three-dimensional domains. As was mentioned earlier, in CMOS the DC part $I_{k,0}$ vanishes, which leaves $$I_k = \int_{T_k} dA \cdot [J(r) + i\omega D(r)]. \qquad (3)$$

To derive an expression for the admittance with Equation (3), which in some embodiments corresponds to or is otherwise related to the characteristic metric, both the conduction current $J$ and the displacement current $i\omega D$ contribute to the phasor $I$ which tracks the delay and amplitude of the bias signal. Ultimately, the bias signal causes a reconfiguration of charge density and therefore both the conductivity in the conduction current and the permittivity in the displacement current impact how delayed the response is and to which extent the charge reconfigures at all. For example, if the conductivity of the nets is low, the delay will be large because charge cannot move quickly enough from the terminal to the surface of the nets.

In some embodiments, the metal interconnect will be viewed as an exceptionally well conducting material such that the nets do not have any internal structure besides their conducting properties. In other words, all charge on the metal interconnects gathers in a narrow volume on the surface such that the current density inside the metal of the metal interconnect obey Ohm's law and $$J(r) = \sigma(r)E(r) = -\sigma(r)\nabla V(r).$$

It is noted that in some embodiments the conductivity $\sigma$ is globally defined so that it is only non-zero within the metal interconnects. With the displacement field of a linear, homogeneous, and isotropic medium $$D(r) = \varepsilon(r)E(r) = -\varepsilon(r)\nabla V(r), \qquad (4)$$

the terminal current of Equation (3) can be written as $$I_k = -i\omega \int_{T_k} dA \cdot [\kappa(r)\nabla V(r)]. \qquad (5)$$

where the complex effective permittivity is defined as $$\kappa(r) = \varepsilon(t) - \frac{i}{\omega}\sigma(r). \qquad (6)$$

For later reference, it is noted that from Equation (4) and Maxwell's equations that the potential fulfills the Poisson equation which turns into the Laplace equation for the present embodiment since there are no space charge densities in either the very well conducting metal interconnects or the oxide:

$$\nabla \cdot (\varepsilon(r)\nabla V(r)) = -\rho(r) = 0, \qquad (7)$$

$$\text{with } V(r)|_{r \in \partial T_j} = V_j^{appl},$$

$$\nabla V(r)|_{r \in \partial D \setminus \cup_j T_j} = 0,$$

where the first boundary condition is a Dirichlet boundary conditions for the terminals and the second boundary condition is a Neumann boundary condition for the rest of the surface of the cell domain.

Furthermore, the continuity equation, which also follows from Maxwell's equations, requires that the current density obey the equation $$0 = \nabla \cdot J(r) + i\omega\rho(r) = -\nabla \cdot (\sigma(r)\nabla V(r)) + i\omega\rho(r).$$

Inside the metal interconnects, the conductivity is assumed to be so large that the first term dominates and the Laplace equation can be approximated as $$0 \approx \nabla \cdot (\sigma(r)\nabla V(r)), \qquad (8)$$

where the potential adheres to the boundary conditions already written in Equation (7). Outside the metal interconnects the conductivity is assumed zero and therefore the space charge density $\rho$ vanishes as well. However, it is noted that this does not mean that the surface charge on the conductor vanishes.

Next the integral of Equation (5) is extended over the boundary of the whole cell domain $\partial D$ while being careful about terminals of internal nets that might be completely enclosed within the cell domain. This means that the surface of the cell domain $\partial D$ might be composed of several disjoint surfaces but as will be shown, a general formulation for the admittance can be extracted, irrespective of the shapes and locations of terminals. To this end, the integrated of Equation (5) is multiplied by a function $f_k(r)$ on D (e.g., where r corresponds to a position within the cell domain which can be described by a plurality of voxels within a simulated environment) that is 1 on $T_k$ and zero on all other $T_j$ with $j \neq k$. Then it follows that $$I_k = -i\omega \int_{T_k} dA \cdot [\kappa(r)\nabla V(r)] \qquad (9)$$

$$= -i\omega \int_{T_k} dA \cdot [f^*(r) \, \kappa(r)\nabla V(r)]$$

$$= -i\omega \int_{\partial D} dA \cdot [f^*(r) \, \kappa(r)\nabla V(r)].$$

The function $f_k$ will be referred to as the fundamental of terminal k. It is appreciated that besides the restrictions on the boundary conditions, the fundamental $f_k$ can be chosen as an arbitrary function $\nabla \cdot (\kappa(r)\nabla f_k(r)) = 0$ so long as a gradient field can be determined (e.g., the fundamental needs to be differentiable or at least nearly differentiable such that a gradient field may be determined). In some embodiments, the function $f_k$ will be required to fulfill the Laplace equation of the form $$\nabla \cdot (\kappa(r)\nabla f_k(r)) = 0, \qquad (10)$$

$$\text{with } f_k(r)|_{r \in \partial T_j} = \delta_{kj},$$

$$\nabla f_k(r)|_{r \in \partial D \setminus \cup_j T_j} = 0,$$

where the first boundary condition is a Dirichlet boundary condition for the terminals and the second boundary condition is a Neumann boundary condition for the rest of the cell domain surface. It is also appreciated that the complex conjugate for the fundamental will be used for reasons which will become clear later. It is also noted that the Neumann boundary condition is permissible because the integrand of Equation (9) vanishes due to the Neumann boundary condition on the electric potential. In the described embodiment, the Equation (10) is a differential equation with complex coefficients whose real and imaginary components are completely equivalent to Equations (7) and (8), respectively. In fact, this choice was made on purpose, as we will see in a moment.

Derivation of the admittance (e.g., the characteristic metric in some embodiments) continues by using the Gaussian integration theorem on Equation (9):

$$\underline{I}_k = -i\omega \int_{\partial D} dA \cdot [f^*(r)\, \kappa(r)\nabla \underline{V}(r)]$$
$$= i\omega \int_D dV \nabla \cdot [f^*(r)\, \kappa(r)\nabla \underline{V}(r)]$$
$$= i\omega \int_D dV [(\nabla f^*(r)) \cdot (\kappa(r)\nabla \underline{V}(r)) + f^*(r)\nabla \cdot (\kappa(r)\nabla \underline{V}(r))].$$

An additional sign is picked up since dA points towards the inside of the volume. The second term on the right hand side can be directly related to Equations (7) and (8) as $$\nabla \cdot (\kappa(r)\nabla \underline{V}(r)) = \nabla \cdot (\varepsilon(r)\nabla \underline{V}(r)) - \frac{i}{\omega}\nabla \cdot (\sigma(r)\nabla \underline{V}(r)) = 0,$$

which enables the determination for the terminal current as $$\underline{I}_k = i\omega \int_D dv (\nabla f^*(r)) \cdot (\kappa(r)\nabla \underline{V}(r)).$$

Since the fundamentals $f_k$ as given by Eq. (10) was chosen to satisfy the same equations as the potential V and because the Laplace equation is linear, the total potential can be written as a superposition of the fundamentals of all terminals:

$$\underline{V} = \sum_\ell f_\ell(r) \underline{V}_\ell^{appl}.$$

Therefore, the terminal current can be obtained as $$\underline{I}_k = i\omega \sum_\ell \int_D dV(\nabla f_k^*(r)) \cdot (\kappa(r)\nabla f_\ell(r))\underline{V}_\ell^{appl} =: \sum_\ell \underline{Y}_{k\ell} \underline{V}_\ell^{appl},$$

which is the same as Equation (2) with the admittance $$\underline{Y}_{k\ell} = i\omega \int_D dV \kappa(r)(\nabla f_k(r))^* \cdot (\nabla f_\ell(r)). \quad (11)$$

To show that admittance can be extracted using Equation (11), a one-dimensional admittance example is provided, which can readily be translated into three-dimensional space in accordance with embodiments of the disclosure. Further, from the derivation of admittance, the RC time constant will be extracted, which can be utilized to determine the local contribution of the characteristic metric (e.g., the admittance, admittance density, RC time constant, or the like).

Figure 3B:
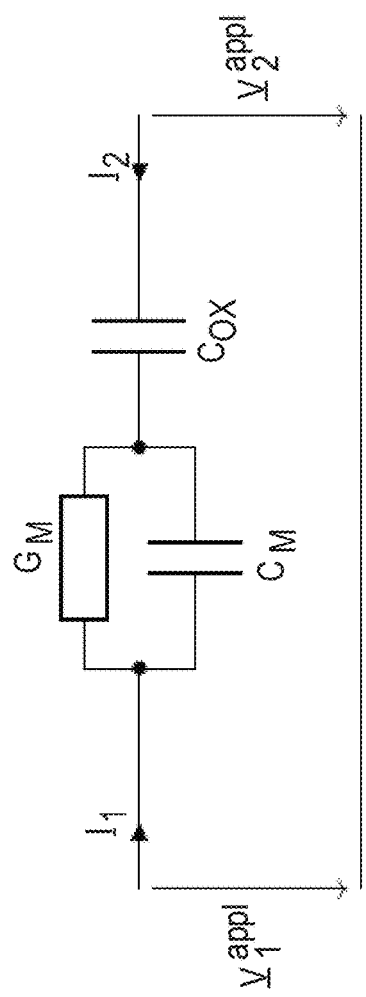
FIG. 3B illustrates a two-port representation of the physical structure shown in FIG. 3A with the conductance and the capacitance of the metal region as well as the capacitance of the oxide region, in accordance with an embodiment of the disclosure.

FIG. 3A illustrates a physical structure of a one-dimensional RC component with terminals on each side, in accordance with an embodiment of the disclosure. FIG. 3B illustrates a two-port representation of the physical structure shown in FIG. 3A with the conductance Gm and the capacitance Cm of the metal region as well as the capacitance Cox of the oxide region, in accordance with an embodiment of the disclosure. On the left and right terminals, small signal biases are applied at frequency @ and characterized by the phasors $\underline{V}_1^{appl}$ and $\underline{V}_2^{appl}$, respectively. To derive the admittance of FIG. 3A with the fundamentals as shown in Equation (11), the Laplace equation for the fundamentals given by Equation (10) for the same structure as FIG. 3A is solved. In the one-dimensional example, the Laplace equation describes linear equations of the form $$f_k^M(x) = \frac{\alpha'_M}{\kappa_M}x + \beta'_M,$$
$$f_k^{OX}(x) = \frac{\alpha'_{OX}}{\kappa_{OX}}x + \beta'_{OX},$$

where $k \in \{1,2\}$ and $\kappa_{OX} = \varepsilon_{OX}$. Then the boundary and interface conditions are given by $$f_k^M(x)\Big|_{x=0} = \delta_{k1},$$
$$f_k^{OX}(x)\Big|_{x=L_M+L_{OX}} = \delta_{k2},$$
$$f_k^M(x)\Big|_{x=L_M} = f_k^{OX}(x)\Big|_{x=L_M},$$
$$\kappa_M \frac{d}{dx}f_k^M(x)\Big|_{x=L_M} = \kappa_{OX}\frac{d}{dx}f_k^{OX}(x)\Big|_{x=L_M},$$

where the last interface condition can be derived from Equation (10) by integrating over an infinitely narrow volume enclosing the interface. It is appreciated that when deriving the admittance directly through the solution of Maxwell's equations, a surface charge is needed to be determined from an extra differential equation imposing current conservation. In contrast, the equation for the fundamentals already includes current conservation, meaning that consideration of the capacitance and resistance The solution for the fundamentals is given by $$f_k^M(x) = \frac{\alpha'_M}{\kappa_M}x + \delta_{k1}, \quad (12)$$

$$f_k^{OX}(x) = \frac{\alpha'_M}{\kappa_{OX}}(x - L_M - L_{OX}) + \delta_{k2}, \quad (13)$$

$$\alpha'_M = \frac{\delta_{k2} - \delta_{k1}}{\frac{L_M}{\kappa_M} + \frac{L_{OX}}{\kappa_{OX}}}.$$

Inserting the solutions into the admittance formula Equation (11), the admittance is found $$\underline{Y}_{k\ell} = i\omega A \int_0^{L_M} dx \kappa_M \frac{(\delta_{k2} - \delta_{k1})(\delta_{\ell 2} - \delta_{\ell 1})}{|\kappa_M|^2 \left|\frac{L_M}{\kappa_M} + \frac{L_{OX}}{\kappa_{OX}}\right|^2} \quad (14)$$

$$+ i\omega A \int_{L_M}^{L_M+L_{OX}} dx \kappa_{OX} \frac{(\delta_{k2} - \delta_{k1})(\delta_{\ell 2} - \delta_{\ell 1})}{|\kappa_{OX}|^2 \left|\frac{L_M}{\kappa_M} + \frac{L_{OX}}{\kappa_{OX}}\right|^2}$$

-continued $$= i\omega A \frac{(\delta_{k2} - \delta_{k1})(\delta_{\ell 2} - \delta_{\ell 1})}{\frac{L_M}{\kappa_M} + \frac{L_{OX}}{\kappa_{OX}}}$$

$$= A \frac{i\omega \kappa_M}{L_M + \frac{\kappa_M}{\kappa_{OX}} L_{OX}} (\delta_{k2} - \delta_{k1})(\delta_{\ell 2} - \delta_{\ell 1}).$$

Figure 4:
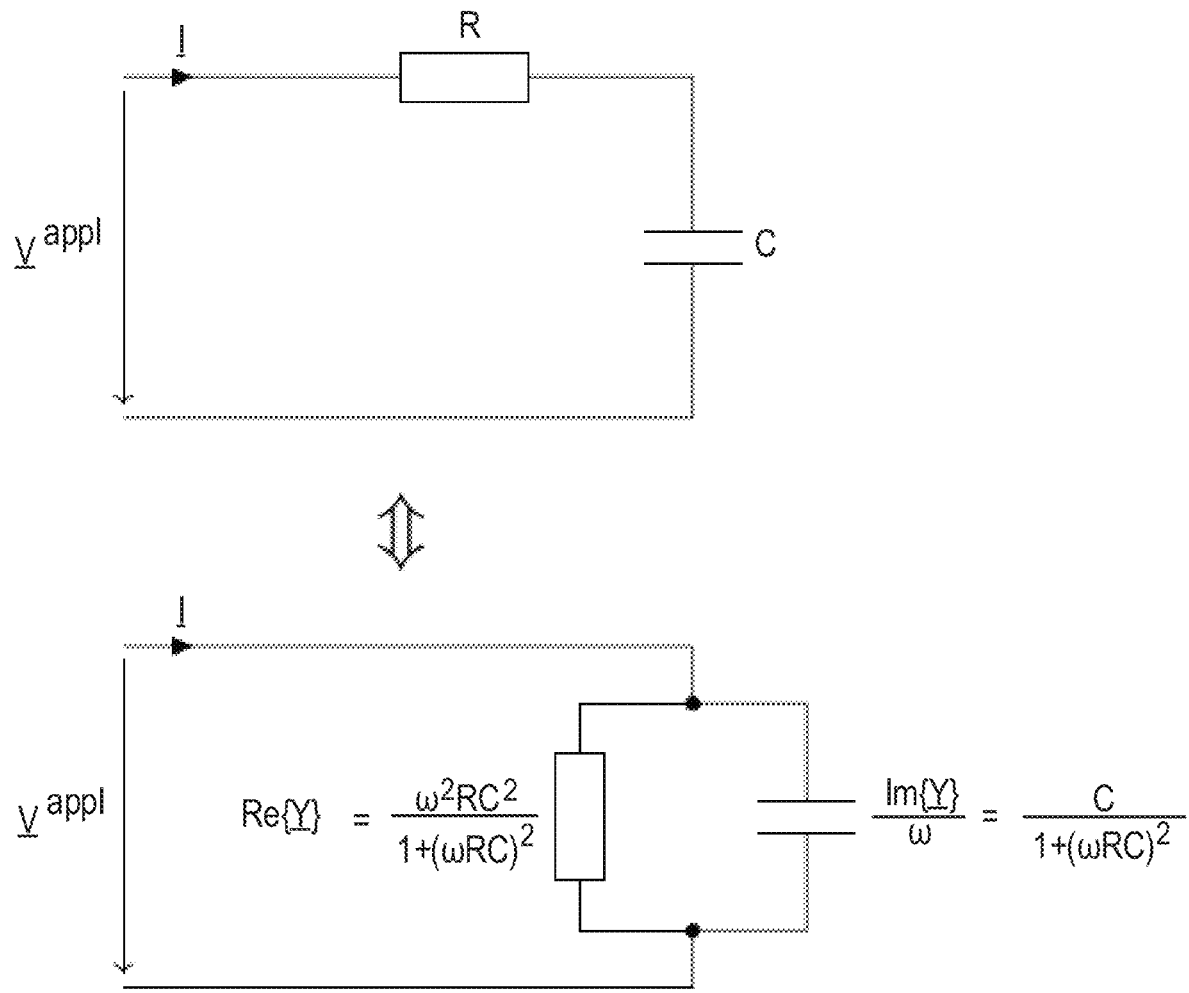
FIG. 4 illustrates an RC-circuit expressed as an admittance, in accordance with an embodiment of the disclosure

FIG. 4 illustrates an RC-circuit expressed as an admittance $\underline{Y}$, in accordance with an embodiment of the disclosure. Now that admittance has been derived with the fundamentals, the RC time constant, "RC," can be extracted. It is appreciated that all information about the system (e.g., a given net and/or integrated circuit) is encoded in the admittance matrix and can be utilized to efficiently extract RC for arbitrary structures. In order to understand how the RC-value is encoded in the admittance, a prototypical RC-circuit shown in FIG. 4 can be utilized.

The expression for the admittance Y can be derived by using Kirchhoff's circuit laws. Interpreting each of the components in the RC-circuit of FIG. 4 as individual admittances the total admittance can be found as $$\underline{Y}_{RC} = \left(\frac{1}{\underline{Y}_R} + \frac{1}{\underline{Y}_C}\right)^{-1} = \left(R + \frac{1}{i\omega C}\right)^{-1} = \frac{i\omega C}{1 + i\omega RC} = \frac{\omega^2 RC^2 + i\omega C}{1 + (\omega RC)^2}$$

Therefore, the RC time constant, "RC" corresponds to $$RC = \frac{\text{Re}\{\underline{Y}\}}{\omega \text{Im}\{\underline{Y}\}}, \quad (15)$$

where Y is the input admittance at the port where the RC time-constant needs to be determined. The input admittance, in turn, can be determined from the admittance matrix and applied loads. In the case of a two-port with ports a, b and a load Y at port b (e.g., as in the case of FIGS. 3A and 3B, with a corresponding to port 1 and b corresponding to port 2), the input admittance at port a is given by $$\underline{Y}_a^{in} := \underline{Y}_{aa} - \frac{\underline{Y}_{ab}\underline{Y}_{ba}}{\underline{Y}_{bb} + \underline{Y}_b^L} \quad (16)$$

It is appreciated that by having the fundamentals be complex conjugated that it becomes clear the self-RC reduces to a form where the conductivity and permittivity define opposing contributions to the RC. Now that a direct relationship between the admittance and the RC time constant in Equation (16) has been established and an expression for the admittance density with the integrand of Equation (11) has been derived, the local contributions of metal and oxide to the overall RC may be determined on a per-voxel basis. In the following sections, a routing algorithm will be described, which is one possible implementation of the method 200 illustrated in FIG. 2. As discussed above, the routing algorithm works without the restrictions of a routing graph, finds paths of least resistance (e.g., wiring routes based on the electromagnetic simulation and/or location contributions to the characteristic metric), resolves routing conflicts reliably, and is capable of handling manufacturing process constraints.

Figure 5A:
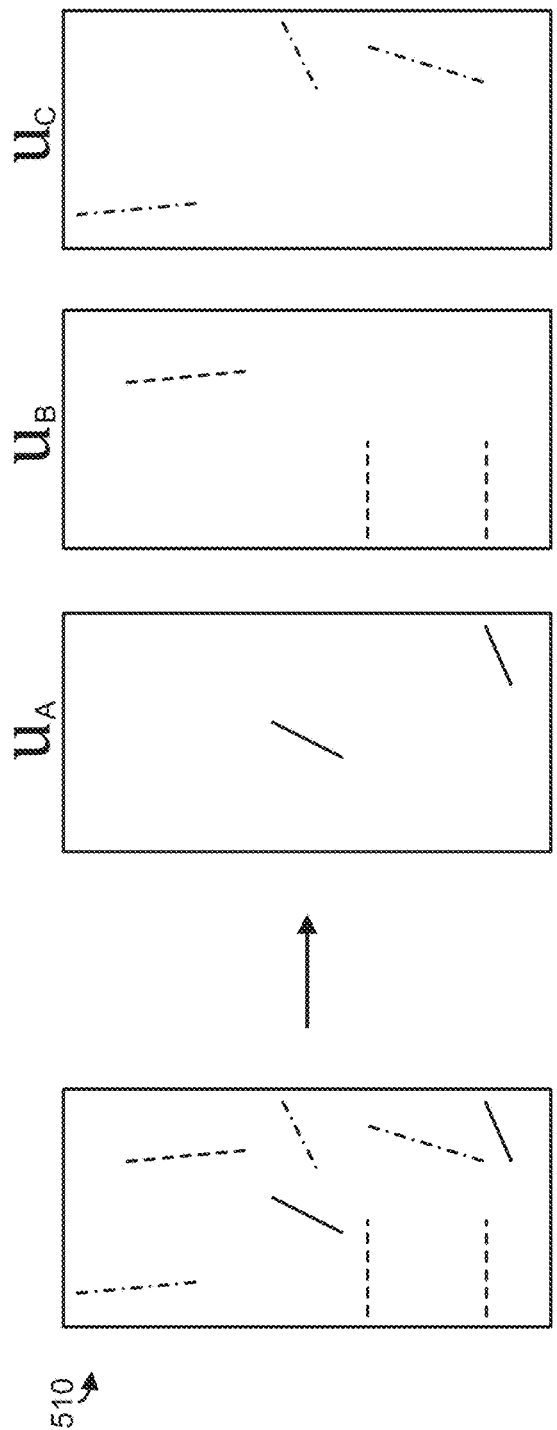
FIG. 5A illustrates an example description of an integrated circuit providing interconnections between individual terminals included in a plurality of terminals and separating the plurality of terminals into different nets based on the interconnections, in accordance with an embodiment of the present disclosure.

FIG. 5A illustrates terminals of nets separated into universes, in accordance with an embodiment of the disclosure. More specifically, a description 510 includes information regarding interconnections of a plurality of terminals represented in FIG. 5A as lines with a common pattern (e.g., solid lines represent terminals intended to be electrically coupled together, dashed lines represent terminals intended to be coupled together, and so on). Each of the interconnections correspond to different nets (e.g., solid lines represent a first net, dashed lines represent a second net, and so on) included in the description of the integrated circuit. It is appreciated that the different nets included the description 510 may be separated into different nets, which will sometimes be referred to as different universes (e.g., $U_A$, $U_B$, $U_C$, and so on) in the context of an instance of a simulated environment (i.e., each universe correspond to an instance of the simulated environment as discussed in relation to FIG. 5B).

Figure 5B:
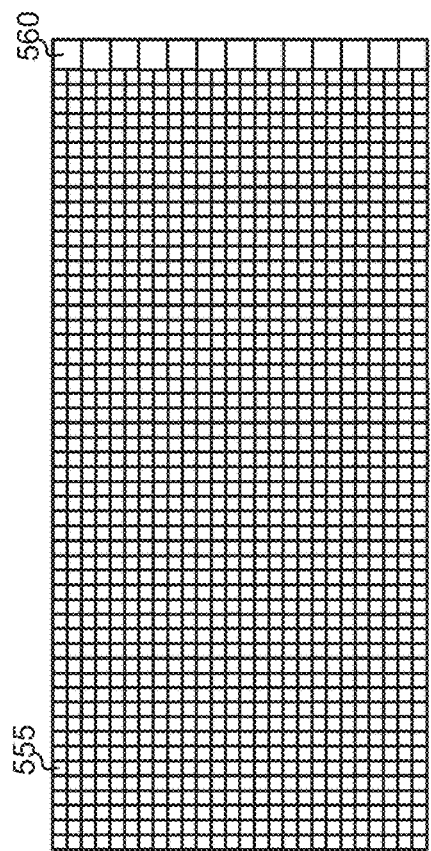
FIG. 5B illustrates an example instance of a simulated environment configurable to be representative of one of the different nets, in accordance with an embodiment of the present disclosure.

FIG. 5B illustrates an example simulated environment 550 defined by a plurality of voxels (e.g., voxels 555 with a first volume and voxels 560 with a second volume different than the first volume), in accordance with an embodiment of the disclosure. It is appreciated that instances of the simulated environment 550 may be configured to be representative of one of a corresponding one of the different nets illustrated in FIG. 5A (e.g., universe $U_A$ corresponding to a first net included in the different nets, universe $U_B$ corresponding to a second net included in the different nets, and universe $U_C$ corresponding to a third net included in the different nets).

In some embodiments, Equation (11) will be utilized to determine the wiring routes (e.g., path of least resistance) of the different nets. Specifically, the integrand of Equation (11) will be referred to as admittance density:

$$y_{kl}(r) = i\omega k(r)(\nabla f_k(r))^* \cdot (\nabla f_l(r)) \quad (17)$$

Thus for N ports, an N×N admittance matrix can be computed by solving only N Laplace equations for the fundamentals as described in the context of Equation (10). Moreover, the calculation of the N fundamentals can be fully parallelized. As described in context of method 200 illustrated in FIG. 2 and shown in FIG. 5A, routing may be initiated without interaction of any of the different nets. This is achieved by solving the routing problem for each net separated in a space without terminals related to other net (e.g., as illustrated in FIG. 5A and discussed in context of the method 200 illustrated in FIG. 2). Specifically, the different nets can be separated into different universes (e.g., instances of the simulated environment 550 illustrated in FIG. 5B configured based on the description 510 of a given net shown in FIG. 5A). Once separated into different universes, Laplace's equations for each terminal in a given universe can be solved and flux between terminals calculated. These fluxes show where the preferred paths (i.e., the corresponding wiring route of a given net included in the different nets) in between terminals. In some embodiments, the fluxes are representative of the local contributions to a characteristic metric, which can be utilized to determine which net gets to claim which parts of space within the simulated environment. It is appreciated that initially, the wiring routes associated with the different nets will collide and therefore penalties (e.g., as discussed in context of the method 200 illustrated in FIG. 2) will be introduced for each net. It is appreciated that with each iteration of determining the wiring routes the penalties will increase, which will result in a resolution of routing conflicts until all universes agree on which fluxes will go where. Once the multiverse is in agreement (e.g., based on a convergence metric discussed previously) the fluxes and/or wiring routes will be merged into a single fully routed design. It is appreciated that due to the separation of the different nets into independent universes that are gradually merged back together, embodiments of the voxel-based and electromagnetic-ware routing algorithm described herein is referred to as a universal router.

Consider an initial 3-dimensional space (e.g., a simulated environment defined by a plurality of voxels) with N nets (e.g., different nets based on a description of an integrated circuit), where the i-th net has $n_i$ terminals. The N nets are separated into N universes as illustrated in FIG. 5A and then a Laplace equation similar to Equation (10) is solved for each of the terminals in each of the universes:

$$\nabla \cdot \left( \frac{1}{p^u(r)} \nabla f_k^u(r) \right) = 0, \quad (19)$$

$$\text{with } f_k^u(r)|_{r \in \partial T_j^u} = \delta_{kj},$$

$$\nabla f_k^u(r)|_{r \in \partial D \setminus \cup_j T_j^u} = 0,$$

where $f_k^u$ is the k-th fundamental in universe u, which is unity on the terminal domain $T_k^u$, zero on all other terminal domains $T_j^u$ with j≠k, and Neumann boundary conditions everywhere else. Notably the complex effective permittivity κ of Equation (6) by be replaced by the reciprocal of a penalty $$\kappa(r) \stackrel{!}{=} \frac{1}{p^u(r)}, \quad p^u : \mathbb{R}^3 \to [1, \infty).$$

As discussed previously, the effective permittivity κ plays the role of a conductivity for electric currents, so if at r (e.g., corresponding to one of the individual voxels included in the plurality of voxels) the penalty p(r) increases, the factor 1/p(r) in Equation (19) reduces the flux through r. In other words, the penalty p is utilized to alter the flow of fluxes (e.g., local contributions to the characteristic metric) in the multiverse (i.e., the simulated environment with instances defined to collectively be representative of an integrated circuit).

With the fundamentals, the admittance density with the penalty field analogous to Equation (17) may be computed as $$\underline{y}_{k\ell}^u(r) = i\omega \frac{1}{p^u(r)} (\nabla f_k^u(r))^* \cdot (\nabla f_\ell^u(r)).$$

And the cross-admittance for a bias at terminal 1 and a current measurement at terminal k is given by the volume integral: $\underline{Y}_{k\ell}^u = \int dV \underline{y}_{k\ell}^u(r)$.

In order to represent fluxes in nets included in the different nets with many terminals, the routing objects can be defined based on a scalar flux-field (i.e., local contributions defined on a per-voxel basis). It is appreciated that wiring routes are directional, which means there is at least one input terminal and at least one output terminal. However, there could be several input and/or output terminals for a given net depending on the configuration of the integrated circuit. Current is assumed to flow through the input terminals to accumulate or deplete charge from the wire surface and the transistor gates. Depending on the switching state of the transistors in the circuit, some inputs might be open and not be able to drive the outputs. In some embodiments, the routing algorithm will attempt to reduce RC as a characteristic metric for all possible paths between inputs and outputs of a net included in the different nets such that any input can drive all outputs. Advantageously, this simplifies the algorithm because dependency on the transistor netlist and its switching states is reduced.

In one embodiment, a net has a single input (e.g., 1) and multiple outputs (e.g., 2, . . . , $n_u$). If how much flux arrives at each terminal is inconsequential, a scalar fluxed field $\tilde{F}$ given by $$\tilde{F}^u(r) := \underline{y}_{11}^u(r) = -\sum_{\ell \neq 1} \underline{y}_{1\ell}^u(r). \quad (20)$$

Here, the admittance density $\underline{y}_{11}^u(r)$ is the contribution of admittance at point r (e.g., corresponding to a given one of the individual voxels) to the overall admittance, which in the present embodiment is just a measure of conductivity. It is also an indirect scalar measure of the flux since regions with high flux will have a bigger impact if the conductivity is changed. The meaning of the subscripts 11 can be understood from the derivation of the admittance from Equation (2), where the first index indicates at which terminal the current is measured and the second index at which the (unit) bias is applied. Thus $\underline{y}_{11}^u$ is admittance measured by observing the current at terminal 1, while a unit bias is applied to terminal 1 and zero bias is applied to all other terminals. This makes it clear by the relationship with the cross-admittances in the second step of Equation (20) holds. The biases are inverted with a unit bias applied on all terminals except 1 resulting in a measurement of an equal but opposing current at terminal 1.

However, the expression in Equation (20) does not account for how increasing the penalty p will lead to gradually smaller fluxes or pruning of paths that are too heavily penalized. Additionally, the outputs may be attached to different loads, which may require a different weighting of the individual wiring routes (e.g., one path takes precedence over other paths because it has to drive a much larger load). To fix this issue the terminal-directed admittance density will be introduced as:

$$\hat{\underline{y}}_{k\ell}^u(r) = \begin{cases} \underline{y}_{k\ell}^u(r), & \text{if } \operatorname{Re}\{\underline{y}_{k\ell}^u\} < 0, \\ 0, & \text{else} \end{cases}. \quad (21)$$

Figure 6:
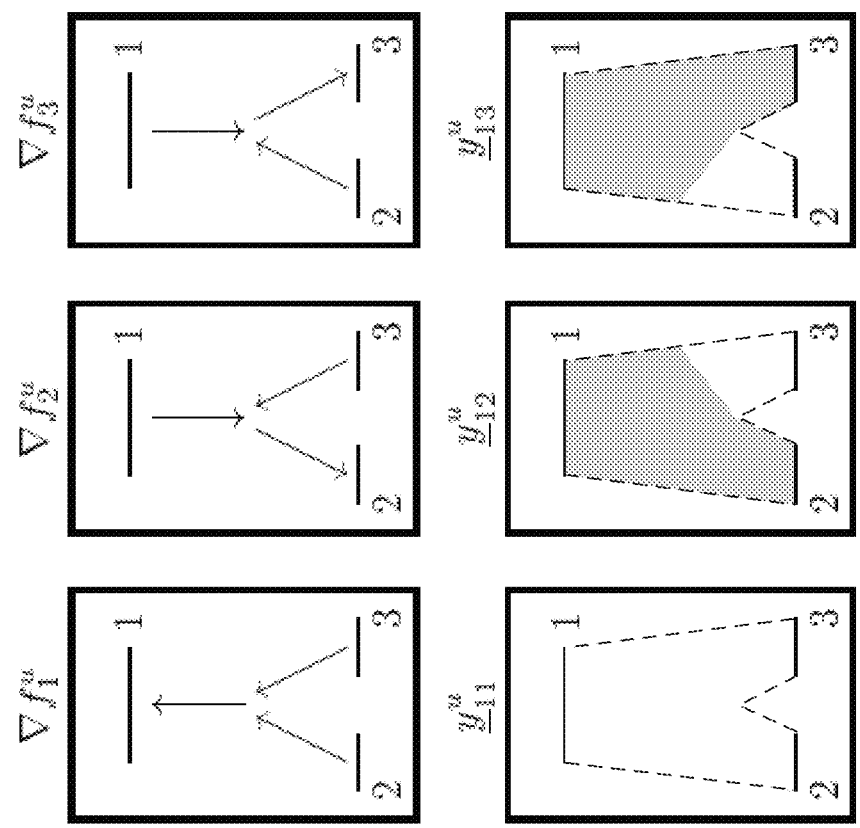
FIG. 6 illustrates vector gradients fields $\nabla f_i$ and the scalar admittance densities $y_{1i}^u$ in a universe with three terminals, in accordance with an embodiment of the present disclosure.

FIG. 6 illustrates vector gradients fields $\nabla f_i$ and the scalar admittance densities $\underline{y}_{1i}^u$ in a universe with three terminals. The white section indicates positive signs and the gray section indicates negative signs. As illustrated in FIG. 6, Equation (21) will select the parts of the cross-admittance densities $\underline{y}_{11}^u$, flowing from terminal k to 1. The respective total admittance is given by $$\hat{Y}_{k\ell} = \int dV \hat{\underline{y}}_{k\ell}^u(r).$$

The terminal-directed admittance density of Equation (21) can be used to normalize each of the cross-admittances separately and obtain the normalized scalar flux:

$$\tilde{F}^u(r) := \sum_{\ell \neq 1} \frac{\alpha_{1\ell}}{\hat{\underline{Y}}_{1\ell}} \hat{\underline{y}}_{1\ell}^u(r), \quad (22)$$

where k is the input terminal, $\tilde{\mathcal{Y}}_{kl}^u$, <0 normalizes the flux originating from terminal i and includes the overall negative sign while $\alpha_{1l}>0$ is an additional weighting factor that depends on the load attached to output i.

Now consider the scalar flux in the presence of multiple inputs, such as $T^{in}=\{k_1, k_2, \ldots\}$. The scalar flux can be determined by summing Equation (22) for each of these input terminals and make sure that the sum on the right hand side of Equation (22) is only run over output terminals:

$$\mathcal{F}^u(r) := \sum_{k \in T^{in}} \sum_{\ell \notin T^{in}} \frac{\alpha_{k\ell}}{\text{Re}\{\hat{\mathcal{L}}_{k\ell}^u\}} \text{Re}\{\hat{y}_{k\ell}^u(r)\}. \tag{23}$$

The normalized flux can then be utilized for the voxel-based algorithm to determine the preferred path (e.g., wiring routes).

Penalty fields $p^u$ (e.g., the penalty described in context of the method 200 illustrated in FIG. 2) can be derived after the fluxes $\mathcal{F}^u$ of all the universes u are calculated. The idea being that regions with local contributions corresponding to high fluxes will be penalized so that fluxes will look for alternative routes in subsequent routing iterations. As discussed previously, penalizations for manufacturability that can be derived from manufacturing process simulations or design rules can also be included in the penalty. In some embodiments, an initial penalty field will be: $p^u \equiv 1$.

At this stage domain specific knowledge may be utilized to prevent wiring routes in certain regions. For example, it would make sense to prevent routing of nets that would cause shorts with the fixed pins (i.e., terminals) of other nets included in the different nets. After each iteration of the routing, the penalties may be updated by:

$$p^u(r) \to ((1+h) + h p^u(r))\left(1 + \alpha \sum_{u' \neq u} \mathcal{F}^{u'}(r)\right)^\beta p_{proc}(r), \tag{24}$$

where the parameter $h \in [0,1]$ determines how much feedback or historic congestion is retained from previous iterations, and $\alpha, \beta > 0$ determine the strength and tail steepness of the penalties based on fluxes in other universes. The term $p_{proc}(r)$ penalizes non-manufacturable designs and will be discussed in the next section. Ramping up the parameters $\alpha$, $\beta$, h slowly with each iteration will ensure that nets can negotiate successfully for the underlying material resources.

The manufacturing penalty $p_{proc}$ depends on the specifics of the process technology used (e.g., vendor process node) to implement the circuits. In some embodiments, the process simulation corresponds to a function that will transform a maskset $M = \{m_1, m_2, m_3, \ldots\}$ and some set of fabrication parameters $\theta$ into three-dimensional fields of material parameters:

$$P(M,\theta) := \{\sigma(r), \varepsilon(r), \ldots\}. \tag{25}$$

The process function P contains lithographic models, details on etching, deposition, and other manufacturing steps such as multi-patterning. Assuming the fluxes $\mathcal{F}^u$ for each universe as been computed, a partition of the three-dimensional space can be derived by extracting which flux is maximal:

$$\zeta(r) = \underset{u}{\text{argmax}} \mathcal{F}^u(r). \tag{26}$$

In a converged system, the partition $\zeta$ indicates the contiguous metal routes connecting the pins (i.e., the wiring route), which can be utilized to find a mapping from the partition to a maskset with the same topology.

Running the process simulation forward as in Equation (25) will yield a three-dimensional structure that is manufacturable and so the right hand side of Equation (25) can be utilized to define a penalty $p_{proc}$ for manufacturability. In the simplest case regions where there is no conductivity which may happen because of design constraints like fixed via sizes and pitches may be penalized.

Convergence is achieved if all scalar fluxes $F^u$ have negotiated on which part of the space (e.g., within the simulated environment) they occupy and which is occupied by other nets. This can be checked by calculating a convergence metric for the collisions of scalar fluxes:

$$\varepsilon_{coll} = \frac{1}{V} \sum_u \sum_{u' \neq u} \int dV \frac{\mathcal{F}^u(r)\mathcal{F}^{u'}(r)}{\left(\mathcal{F}^u(r) + \mathcal{F}^{u'}(r)\right)^2}, \tag{27}$$

which is a dimensionless quantity formed of the sum of geometric means of all scalar fluxes at each point. In the beginning of the routing, plenty of scalar fluxes have non-zero values in the same regions and therefore $\varepsilon_{coll} > 0$. As the iteration progresses and the penalties for these collisions increase, the scalar fluxes attempt to avoid each other and therefore $\varepsilon_{coll} \to 0$. Thus $\varepsilon_{coll}$ can be used as a convergence criterion in some embodiments.

When convergence has been achieved, all universes have negotiated with each other and know which paths to take and all routing conflicts have been resolved. The partition $\zeta(r)$ of Equation (26) segments the three-dimensional space into fully connected nets and thus a maskset can be generated based on the wiring routes to extract a merged multiverse with nets that are fully connected and (mostly) free of undesired shorts between each other.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer-implemented method for integrated circuit routing, the computer-implemented method comprising:
receiving a description of interconnected terminals of an integrated circuit, the description including a wiring route electrically coupling the interconnected terminals;
configuring a simulated environment defined via a plurality of voxels based on the description, and wherein individual voxels included in the plurality of voxels each correspond to a spatial representation for a corresponding region of a layout associated with the integrated circuit;
determining local contributions of the individual voxels to a characteristic metric of the integrated circuit based on an electromagnetic simulation of the integrated circuit;
revising the wiring route based on the local contributions of the individual voxels.

2. The computer-implemented method of claim 1, wherein the characteristic metric is representative of at least one of a resistance, a capacitance, an admittance, an admittance density, an impedance, or an RC time constant associated with the integrated circuit.

3. The computer-implemented method of claim 2, wherein the characteristic metric is further representative of a manufacturing constraint associated with a fabricability of the wiring route.

4. The computer-implemented method of claim 1, wherein the individual voxels each include a material parameter indicative of a material property of the corresponding region, and wherein the local contributions are calculated, at least in part, based on the material parameter of the individual voxels.

5. The computer-implemented method of claim 4, wherein the electromagnetic simulation is based on the material parameter of the individual voxels and a bias signal applied to the interconnected terminals.

6. The computer-implemented method of claim 4, wherein the material parameter is associated with at least one of conductivity or relative permittivity.

7. The computer-implemented method of claim 4, further comprising:
applying a penalty to the individual voxels to adjust the characteristic metric, wherein the penalty influences the material parameter of the individual voxels such that the local contributions determined via the electromagnetic simulation are affected by the penalty; and
determining recalculated local contributions of the individual voxels to the characteristic metric with the material parameter of the individual voxels affected by the penalty, and wherein the wiring route is revised based on the recalculated local contributions.

8. The computer-implemented method of claim 1, wherein the spatial representation provided by the plurality of voxels is three-dimensional, and wherein the plurality of voxels includes a first voxel with a first volume and a second voxel with a second volume different than the first volume.

9. The computer-implemented method of claim 1, further comprising determining the characteristic metric based, at least in part, on the electromagnetic simulation.

10. A computer-implemented method for generating integrated circuit layouts, the computer-implemented method comprising:
receiving a description of an integrated circuit, the description providing interconnections between individual terminals included in a plurality of terminals associated with the integrated circuit;
separating the plurality of terminals into different nets based on the interconnections;
configuring instances of a simulated environment collectively representative of a layout associated with the integrated circuit, wherein the simulated environment is spatially discretized via a plurality of voxels, wherein individual voxels included in the plurality of voxels correspond to respective regions of the layout, and wherein each instance included in the instances of the simulated environment is representative of a corresponding one of the different nets;
determining local contributions of the individual voxels to a characteristic metric of the integrated circuit for the instances of the simulated environment based on an electromagnetic simulation of the integrated circuit; and
generating wiring routes for the different nets based on the local contributions of the individual voxels.

11. The computer-implement method of claim 10, wherein the characteristic metric is representative of at least one of a resistance, a capacitance, an admittance, an admittance density, an impedance, or an RC time constant associated with the integrated circuit.

12. The computer-implemented method of claim 10, wherein the individual voxels each include a material parameter indicative of a material property of the corresponding region, and wherein the local contributions are calculated, at least in part, based on the material parameter of the individual voxels.

13. The computer-implemented method of claim 12, further comprising:
applying a penalty to the individual voxels to adjust the characteristic metric, wherein the penalty influences the material parameter of the individual voxels such that the local contributions determined via the electromagnetic simulation are affected by the penalty.

14. The computer-implemented method of claim 13, further comprising:
determining recalculated local contributions of the individual voxels to the characteristic metric with the material parameter of the individual voxels affected by the penalty; and
revising the wiring routes based on the recalculated local contributions.

15. The computer-implemented method of claim 14, further comprising:
determining a convergence metric indicative of a presence of routing conflicts between different nets based on the wiring routes; and
converging the wiring routes into a finalized layout of the integrated circuit when the convergence metric is below a convergence threshold.

16. The computer-implemented method of claim 15, further comprising:
updating the penalty when the convergence metric is greater than the convergence threshold, wherein updating the penalty includes:
identifying incompatible regions of the layout corresponding to where conductivity collisions across different instances included in the instances of the simulated environment occur between spatially overlapping voxels included in the plurality of voxels; and revising the penalty applied to corresponding voxels associated with the incompatible regions.

17. The computer-implemented method of claim 14, further comprising:

determining whether the wiring routes are fabricable, and wherein the characteristic metric is representative of a manufacturing constraint associated with a fabricability of the wiring routes;

identifying one or more unfabricable voxels associated with the wiring routes; and revising the penalty applied to the unfabricable voxels.

18. The computer-implemented method of claim 17, wherein the determining whether the wiring routes are fabricable includes performing a process simulation to generate a fabrication maskset representative of the wiring routes.

19. The computer-implemented method of claim 12, wherein the material parameter is associated with at least one of conductivity or relative permittivity.

20. The computer-implemented method of claim 10, wherein the electromagnetic simulation is based on the material parameter of the individual voxels and a bias signal applied to the plurality of terminals.

21. The computer-implemented method of claim 10, wherein each instance included in the plurality of instances of the simulated environment is representative of the corresponding one of the different nets without other nets included in the different nets.

22. The computer-implemented method of claim 10, wherein the individual voxels included in the plurality of voxels are three-dimensional, and wherein the plurality of voxels includes a first voxel with a first volume and a second voxel with a second volume different than the first volume.

* * * * *

UNITED STATES PATENT AND TRADEMARK OFFICE
CERTIFICATE OF CORRECTION

PATENT NO. : 12,067,339 B2
APPLICATION NO. : 17/570019
DATED : August 20, 2024
INVENTOR(S) : Raj Apte et al.

It is certified that error appears in the above-identified patent and that said Letters Patent is hereby corrected as shown below:

In the Claims

Column 26, Lines 5-6, Claim 20:
Now reads: "the material parameter"; should read -- a material parameter --

Column 26, Line 9, Claim 21:
Now reads: "the plurality of instances"; should read -- the instances --

Signed and Sealed this
First Day of October, 2024

Katherine Kelly Vidal
*Director of the United States Patent and Trademark Office*